(12) United States Patent
Rowhani et al.

(10) Patent No.: US 9,977,854 B2
(45) Date of Patent: May 22, 2018

(54) INTEGRATED CIRCUIT IMPLEMENTING STANDARD CELLS WITH METAL LAYER SEGMENTS EXTENDING OUT OF CELL BOUNDARY

(71) Applicants: ATI Technologies ULC, Markham (CA); Advanced Micro Devices, Inc., Sunnyvale, CA (US)

(72) Inventors: Omid Rowhani, Markham (CA); Ioan Cordos, Markham (CA); Kerry Hamel, Boxborough, MA (US); Donald Clay, Boxborough, MA (US)

(73) Assignees: ATI Technologies ULC, Markham (CA); Advanced Micro Devices, Inc., Santa Clara, CA (US)

( * ) Notice: Subject to any disclaimer, the term of this patent is extended or adjusted under 35 U.S.C. 154(b) by 0 days. days.

(21) Appl. No.: 15/207,691

(22) Filed: Jul. 12, 2016

(65) Prior Publication Data
US 2018/0018419 A1    Jan. 18, 2018

(51) Int. Cl.
*G06F 17/50* (2006.01)
*H01L 27/02* (2006.01)
*H01L 27/118* (2006.01)

(52) U.S. Cl.
CPC ...... *G06F 17/5072* (2013.01); *G06F 17/5077* (2013.01); *H01L 27/0207* (2013.01); *H01L 27/11807* (2013.01); *H01L 2027/11875* (2013.01)

(58) Field of Classification Search
CPC ............ G06F 17/5072; G06F 17/5077; H01L 27/0207; H01L 27/11807; H01L 2027/11875
See application file for complete search history.

(56) References Cited

U.S. PATENT DOCUMENTS

| 6,174,742 B1 | 1/2001 | Sudhindranath et al. |
|---|---|---|
| 6,351,841 B1 | 2/2002 | Tickle |
| 6,903,389 B1 | 6/2005 | Tai |
| 7,036,103 B2 * | 4/2006 | Miller ................. G06F 17/5072 716/122 |

(Continued)

OTHER PUBLICATIONS

Partial European Search Report and Provisional Opinion correlating to 16205250.0-1552 , dated Jul. 19, 2017, 11 pages.

(Continued)

*Primary Examiner* — Naum B Levin

(57) ABSTRACT

A computer-implemented method of fabricating an integrated circuit structure includes selecting a first cell from a standard cell library, the first cell having a cell boundary and comprising a metal segment at a first metal track at a metal layer, the metal segment extending along a direction and terminating a specified distance beyond a first edge of the cell boundary. The method further includes placing the first cell at a first location of a physical layout for the integrated circuit structure. The method also includes selecting a second cell from the standard cell library and placing the second cell at a second location of the physical layout such that a second edge of a cell boundary of the second cell abuts the first edge of the cell boundary of the first cell, and wherein the metal segment extends into a metal track at the metal layer of the second cell.

18 Claims, 5 Drawing Sheets

(56) References Cited

U.S. PATENT DOCUMENTS

| | | | |
|---|---|---|---|
| 7,089,521 B2* | 8/2006 | Kurzum | G06F 17/5072 |
| | | | 716/122 |
| 7,564,077 B2* | 7/2009 | Ko | G06F 17/5072 |
| | | | 257/204 |
| 7,640,522 B2* | 12/2009 | Gupta | G06F 17/5068 |
| | | | 430/5 |
| 8,214,778 B2* | 7/2012 | Quandt | G06F 17/5068 |
| | | | 716/100 |
| 8,423,946 B1* | 4/2013 | Jin | G06F 17/5045 |
| | | | 716/126 |
| 8,661,392 B2* | 2/2014 | Quandt | H01L 27/0207 |
| | | | 716/119 |
| 8,742,464 B2 | 6/2014 | Sherlekar | |
| 9,530,795 B2* | 12/2016 | Quandt | H01L 27/0207 |
| 2010/0115484 A1 | 5/2010 | Frederick | |
| 2010/0155783 A1 | 6/2010 | Law | |
| 2012/0249182 A1 | 10/2012 | Sherlekar | |
| 2013/0181297 A1 | 7/2013 | Liaw | |
| 2013/0234212 A1 | 9/2013 | Lu | |
| 2014/0167117 A1 | 6/2014 | Quandt et al. | |
| 2014/0327050 A1 | 11/2014 | Hsieh et al. | |
| 2016/0163714 A1 | 6/2016 | Mojumder et al. | |

OTHER PUBLICATIONS

Search Report dated Nov. 23, 2017 for European Application No. 16205250.0, 6 pages.
International Search Report and Written Opinion correlating to PCT/US17/041349, dated Sep. 29, 2017, 11 pages.
European Examination Report dated Dec. 20, 2017 for EP Application No. 16 205 250.0, 8 pages.

* cited by examiner

INTEGRATED CIRCUIT IMPLEMENTING STANDARD CELLS WITH METAL LAYER SEGMENTS EXTENDING OUT OF CELL BOUNDARY

BACKGROUND

Field of the Disclosure

The present disclosure relates generally to integrated circuit devices and, more particularly, standard-cell based design and fabrication of integrated circuit devices.

Description of the Related Art

Cell-based design methodologies permit application-specific integrated circuits (ASICs), Systems-on-a-chip (SoCs), and other complex integrated circuit (IC) structures to be efficiently designed by abstracting a digital function of the IC structure. In such methodologies, a standard cell is a collection of gate-level elements and interconnection structures standardized at a functional level. There are a number of standard cells providing different functions that typically are pre-designed and pre-verified, and then collected into a library. Electronic design automation (EDA) tools then may use this standard cell library in designing the physical layout of an integrated circuit (IC). One such EDA tool is a place and route tool, which builds the physical layout of an IC design from the cells represented by the standard cell library. The place and route tool places the cells side-by-side and uses a routing tool to electrically connect the cells in a specified way to implement corresponding logic of the IC design.

To ensure that an IC design using standard cells can be manufactured by a semiconductor foundry, the semiconductor foundry typically supplies the designer with a set of design rules that apply to a specified technology process, whereby these design rules specify various parameters pertaining to spacing, width, enclosure, and extension for the physical elements within the physical layout of the IC design. A design rule check (DRC) tool thus applies the specified design rules to the IC design to verify that all design rules are met and thus the IC may be fabricated as designed using the specified technology process.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
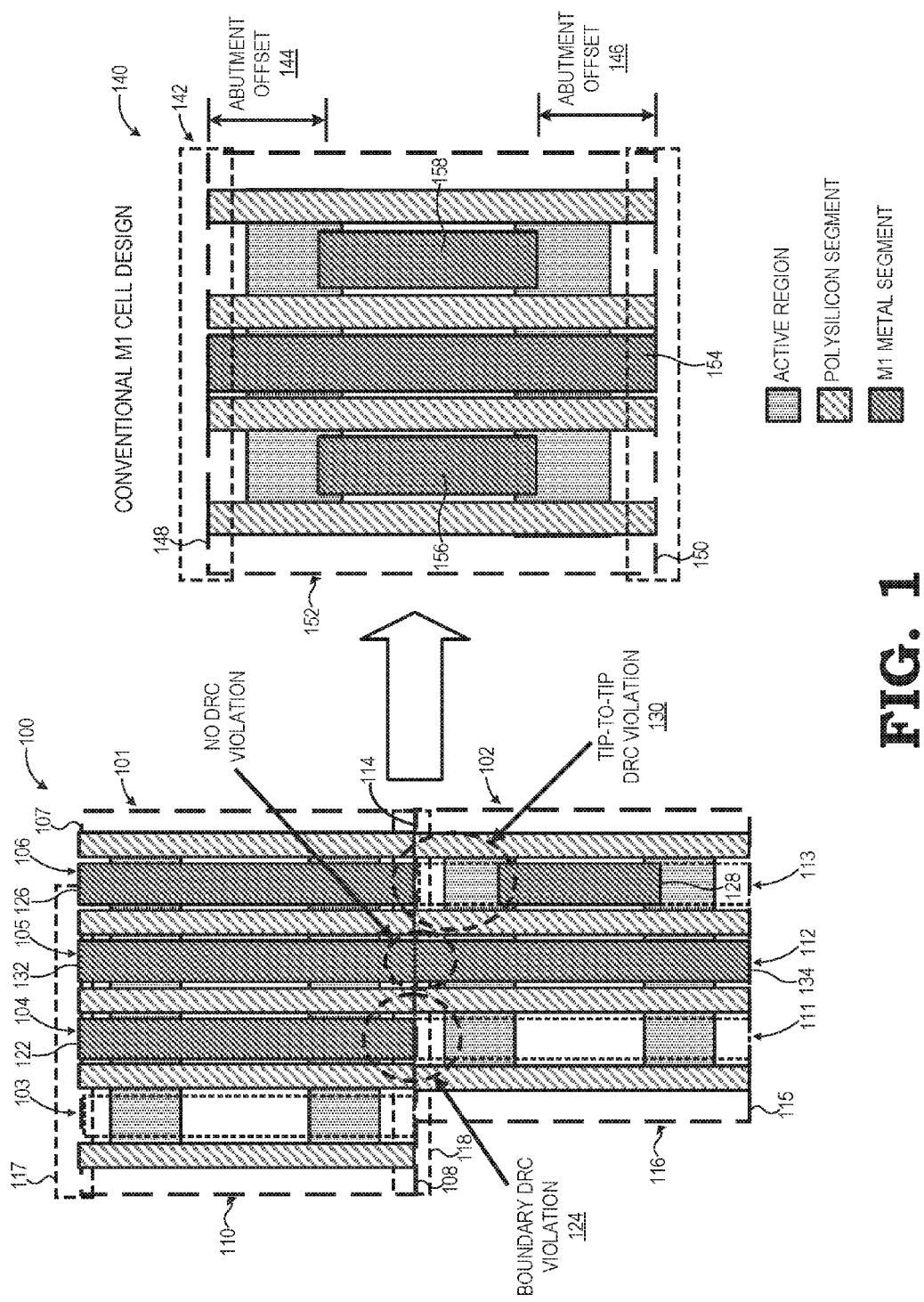
FIG. 1 is a diagram illustrating an example two-cell layout with design rule check violations and a corresponding conventional standard cell design to mitigate the design rule check violations in accordance with some embodiments.

The design and fabrication process of an IC structure using a cell-based methodology typically entails the verification of the physical layout of the IC design in view of various design rules provided by a semiconductor foundry for a specified technology process. These design rules often include a subset of design rules pertaining to the spacing and other interactions between metal segments of abutting or adjacent cells at the Metal 1 (M1) layer. FIG. 1 illustrates examples of such design rules, and the conventional approach to standard cell design so as to conform with such rules.

As depicted by the plan view diagram 100 of FIG. 1, the physical layout for an IC structure using cell-based methodology typically involves the placement of two or more standard cells in a row, such as the depicted abutting standard cells 101, 102 (with the row having a vertical arrangement in relation to the orientation of FIG. 1). Typically, each standard cell represents a corresponding function of the IC design (e.g., a Boolean logic function or a storage function) and is formed of transistor elements and the conductive interconnects that connect the various transistor elements of the cell. As such, each cell has a cell boundary containing one or more P-type or N-type active regions formed in a semiconductor substrate or, for a silicon-on-insulator (SOI) implementation, an epitaxial layer of doped or undoped semiconductor material. Formed over the substrate and the active regions contained therein are polycrystalline silicon ("polysilicon") segments (or metal gate segments), which together with the active regions and other structures (not shown) form the transistors or other circuit elements of the cell.

One or more metal layers are then formed over the active area and patterned so as to form metal segments at one or more layers, whereby these metal segments serve to interconnect circuit elements within the cell or to interconnect circuit elements between cells. Each cell includes a plurality of metal tracks that define the positions and dimensions the metal segments may occupy at a given metal layer. To illustrate, as shown by diagram 100, for the Metal 1 (M1) layer the cell 101 includes metal tracks 103, 104, 105, 106 that extend from edge 107 to opposing edge 108 of a cell boundary 110 for the cell 101, whereas the cell 102 includes, for the M1 layer, metal tracks 111, 112, 113 that extend from edge 114 to opposing edge 115 of a cell boundary 116 for the cell 102.

In many lithography fabrication processes, metal tracks that are to contain at least one metal segment are filled with metal, and then one or more cut masks (or "trim" masks) are used to pattern the metal within the metal tracks so as to form the intended pattern of metal segments at the given metal layer. These cut masks also are used to cut the metal at cell boundaries so as to prevent shorts or other undesirable electrical interactions between metal segments of adjacent, or abutting, cells. To illustrate, one or more cut masks may introduce metal cuts 117, 118 at the cell boundaries 110, 116 so as to electrically isolate the M1 metal segments of cell 101 from the M1 metal segments of cell 102, and vice versa.

In association with a particular technology process specified to be used to fabricate an IC structure including cells 101, 102, a semiconductor foundry may supply a set of design rules that includes design rules pertaining to the termination of metal segments in relation to the location of various boundary metal cuts. To illustrate, the design rule set may include a tip-to-tip minimum distance requirement that specifies that unless the tips of two metal segments in the same track in abutting cells are immediately adjacent to each other (that is, the metal runs continuously across the abutting cell boundaries), the tips must be a minimum distance apart that typically represents the width of the metal cut layer. Otherwise, if the tip spacing is not generated by a metal cut, the designer must ensure the tips are spaced an adequate distance apart which is typically larger—sometimes significantly larger—than the cut layer's width. As noted, it is not always possible to guarantee the metals can be continuous and therefore cut with the cut layer. So in those cases one must ensure the normal tip-to-tip spacing is observed. To illustrate using diagram 100, a metal segment 122 in metal track 104 of cell 101 would trigger a cell boundary design rule violation 124 as the tip of the metal segment 122 terminates in the region of the metal cut 118 while there is no abutting tip of a metal segment in the corresponding metal track 111 of the cell 102. Likewise, the metal segment 126 in metal track 106 of cell 101 and the metal segment 128 in the metal track 113 of cell 102 together would trigger a tip-to-tip minimum distance design rule violation 130 as the facing tips of the metal segments 126, 128 are not separated by a minimum specified distance (given that they are not immediately abutting so that a continuous metal segment is formed across the metal cut 118). In contrast, even though the facing tips of metal segment 132 in metal track 105 and metal segment 134 in metal track 112 both terminate in the region of the metal cut 118, the tips of metal segments 132, 134 immediately abut each other and thus together form a continuous metal segment that is continuous across the metal cut 118, and thus avoids violation of the design rules pertaining to the dimensional relationships of the tips of metal segments and cuts at the cell boundaries.

These boundary-related design rules for the M1 layer have resulted in the conventional M1 layer approach for standard cells as exemplarily illustrated by diagram 140 of FIG. 1. As shown by the layout view represented by diagram 140, conventional standard cell designs resolve the boundary-related design rules by employing an abutment offset zone on each edge of a cell 142 that may abut another cell in the same row (e.g., abutment offset zones 144, 146 at opposing edges 148, 150, respectively, of cell boundary 152). In this approach, a metal segment may either terminate at the cell boundary (e.g., metal segment 154) or terminate short of the abutment offset zone (e.g., metal segments 156, 158), but may not terminate within the abutment offset zone. The length of the abutment offset zone is set to approximately half the minimum tip-to-tip spacing required by the design rules. Thus, assuming a minimum tip-to-tip spacing of 120 nanometers (nm), the length of the abutment offset zone may be set to approximately 60 nm, and thus when two cells are placed in adjacent locations, the two facing abutment offset zones together provide the 120 nm minimum tip-to-tip spacing.

While addressing the boundary-related design rules, this conventional M1 design approach introduces various inefficiencies. For one, if the metal segment in one metal track terminates at an edge of the cell boundary, the abutting cell at this edge also must have a metal segment in the corresponding track that terminates at the edge boundary so as to meet the design rule that metal must continuously extend across a metal cut. This limits the flexibility of standard cell design. One solution is to have all M1 metal segments extend from edge to edge on the cell boundary. However, this prevents the use of any M1 routing within the metal tracks because all of the metal segments will have to be cut on the cell boundary and thus fully occupy the metal tracks. Conversely, while using shorter M1 metal segments that terminate before the opposing abutment offset zones may avoid violation of boundary cut design rules and adhere to tip-to-tip spacing design rules, these relatively short metal segments have relatively limited pin access to higher metal layers (Metal 2 (M2) and above) due to their relatively short length, as described in greater detail below with reference to FIG. 4.

Figure 2:
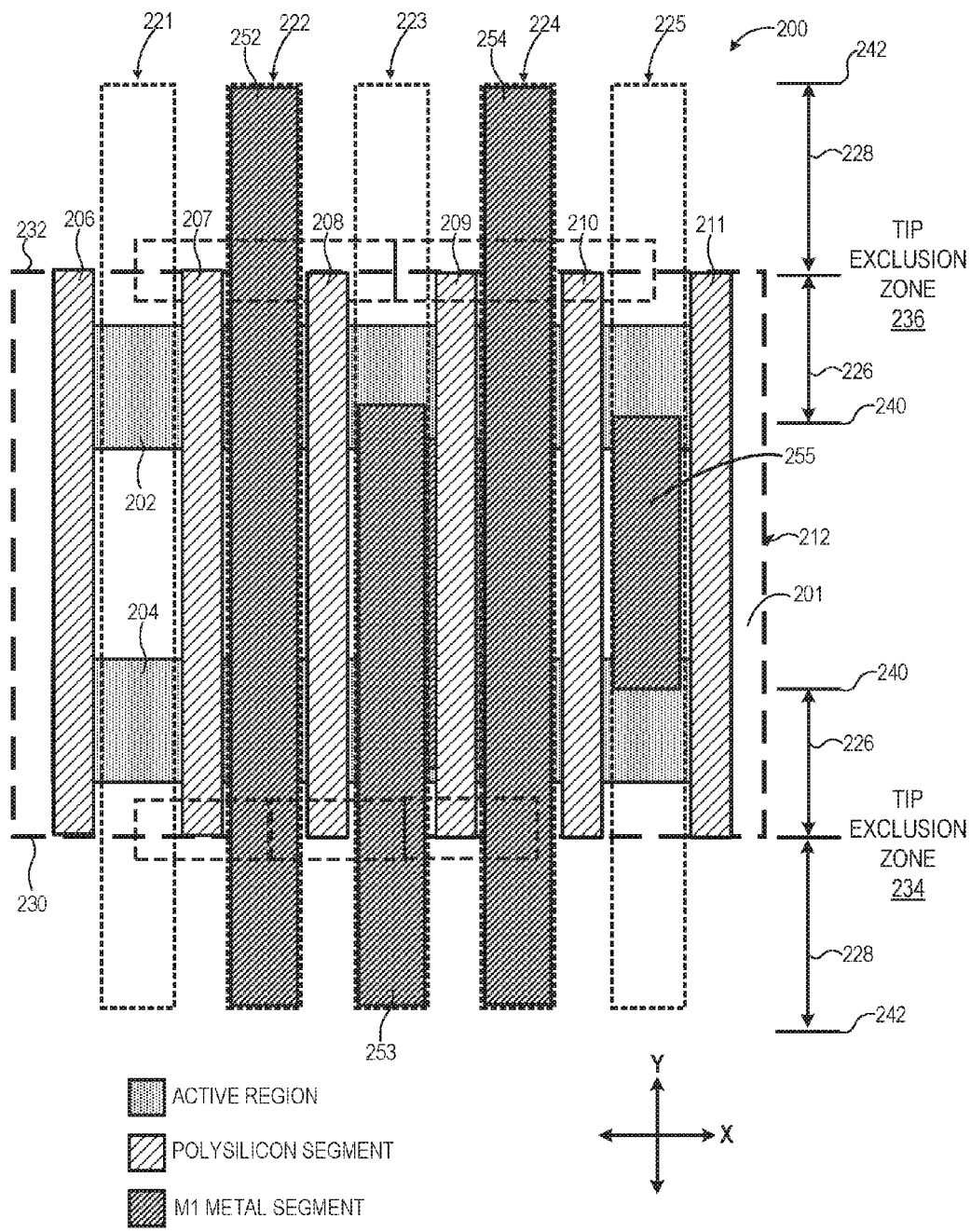
FIG. 2 is a diagram illustrating an example cell layout with metal tracks permitting extension of metal segments beyond a cell boundary in accordance with some embodiments.

FIG. 2 illustrates an improved standard cell design approach that conforms to boundary cut design rules and tip-to-tip spacing design rules while also facilitating M1 routing and increased pin access to higher metal layers in accordance with some embodiments. As shown in the physical layout depicted by FIG. 2, a cell 200 includes one or more active regions (e.g., active regions 202, 204), polysilicon segments (e.g., polysilicon segments 206, 207, 208, 209, 210, 211), and other circuit elements formed on a semiconductor substrate 201 (or SOI substrate) and contained within a cell boundary 212, with the cell layout extending in both the orthogonal X and Y directions as shown. The cell 200 further includes, at the M1 metal layer, a plurality of metal tracks extending along the Y direction, such as metal tracks 221, 222, 223, 224, 225.

As with conventional cell design approaches, each metal track either is devoid of metal segments, or contains one or more metal segments that extend within the corresponding metal track. However, unlike conventional cell design approaches, the design of cell 200 does not incorporate abutment exclusion zones that require termination of metal tips at either the cell boundary or a minimum distance from the cell boundary. Rather, as shown in the example of FIG. 2, the design of cell 200 provides that the tip of a M1 metal segment must either (1) terminate at least a specified minimum distance 226 from the corresponding edge of the cell boundary 212, or (2) extend beyond the corresponding edge of the cell boundary 212 by a specified distance 228. That is, rather than using an abutment offset zone contained entirely within the cell boundary of a cell, the design approach for cell 200 is to employ, at each opposing edge 230, 232 of the cell boundary 212, a corresponding tip exclusion zone 234, 236 that extends from within the cell boundary 212 to beyond the cell boundary to a plane that is the specified distance 228 from the corresponding boundary edge. For each tip exclusion zone, a metal segment is specified so as to terminate at or before the in-boundary edge 240, or the metal segment must terminate outside of the cell boundary 212 at the out-of-boundary edge 242.

To illustrate, the depicted example implementation of cell 200 includes four metal segments: metal segment 252 in track 222, and having a tip terminating at out-of-boundary edge 242 of the tip exclusion zone 234 and a tip terminating at out-of-boundary edge 242 of the tip exclusion zone 236; metal segment 253 in track 223, and having a tip terminating at out-of-boundary edge 242 of the tip exclusion zone 234 and a tip terminating at or before the in-boundary edge 240 of the tip exclusion zone 236; metal segment 254 in track 224, and having a tip terminating at out-of-boundary edge 242 of the tip exclusion zone 234 and a tip terminating at out-of-boundary edge 242 of the tip exclusion zone 236; and metal segment 255 in track 225, and having a tip terminating at or before the in-boundary edge 240 of the tip exclusion zone 234 and a tip terminating at or before the in-boundary edge 240 of the tip exclusion zone 236. Thus, as illustrated by the four metal segments 252-255, the metal segments of the cell 200 either terminate at or before the in-boundary edge 240, or extend out of the cell boundary 212 to the out-of-boundary edge 242.

This design approach has a number of advantages. By ensuring that the tip of a metal segment either terminates at least the minimum distance 226 from the cell boundary edge or extends beyond the cell boundary edge by the distance 228, two adjacent cells employing this design approach will result in a physical layout for the two cells in which, for any given metal segment in one cell, the distance between the tip of this metal segment is at least the minimum specified tip-to-tip distance from the facing tip of the metal segment in the corresponding track of the other cell, or the tip of the metal segment of one cell extends into the corresponding track of the other cell, and thus complies with the design rule that specifies that M1 metal must either completely absent from a set of abutting tracks within a metal cut region, or the M1 metal must extend entirely across the metal cut region for the set of abutting tracks. Further, in at least one embodiment, the distances 226, 228 are set to be approximately equal, such that a metal segment in one cell that has a tip that terminates at the distance 226 from an edge of the cell boundary of that cell will abut the tip of a metal segment that extends the distance 228 from the corresponding edge of the cell boundary of an adjacent cell, as illustrated in greater detail below.

Figure 3:
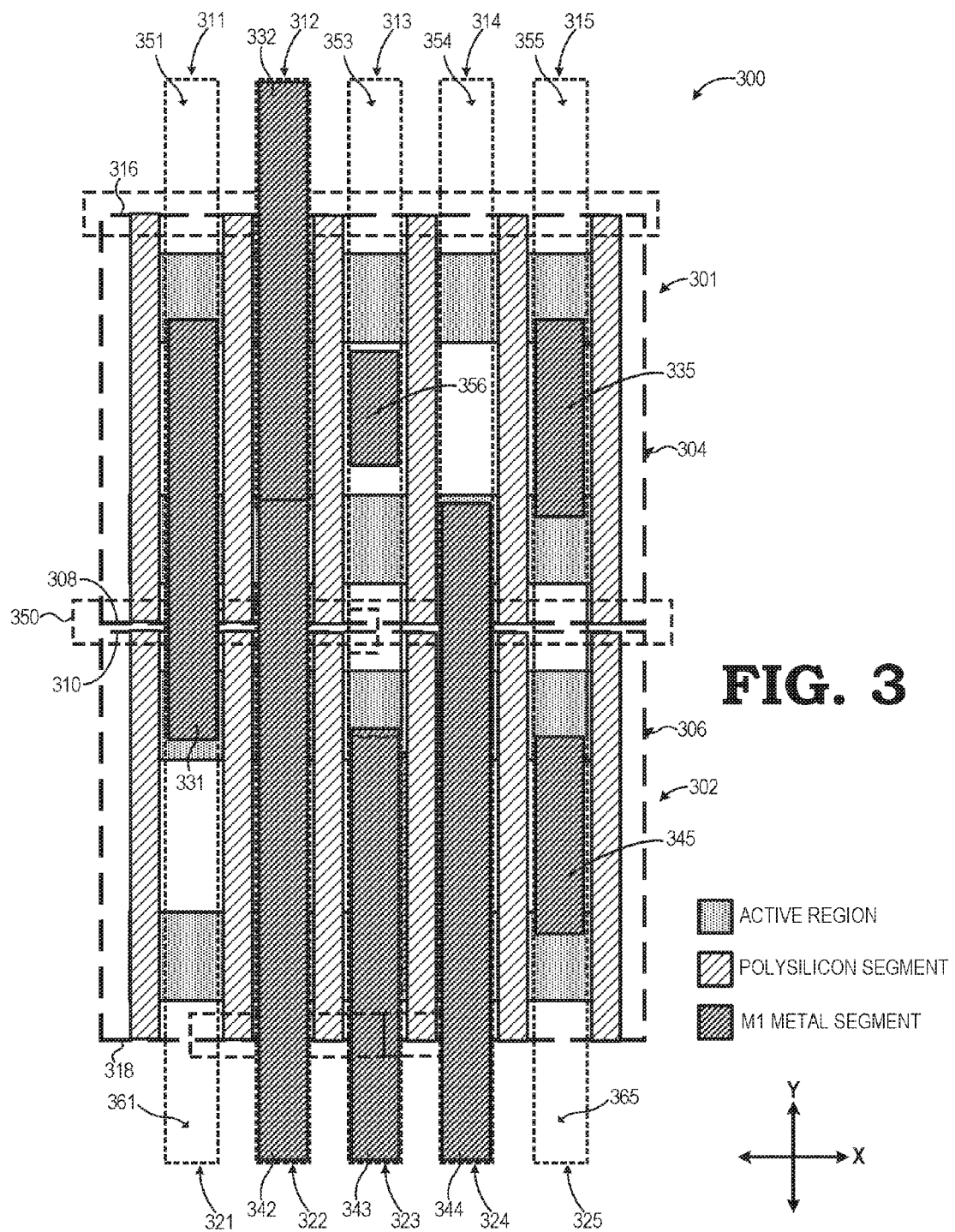
FIG. 3 is a diagram illustrating an example layout of two abutting cells with metal segments that overlap metal tracks in accordance with some embodiments.

FIG. 3 illustrates an example of the beneficial implementation of the cell design approach outlined above in accordance with some embodiments. In this example, an IC structure 300 (e.g., an ASIC or system on a chip (SOC)) includes two cells 301, 302 placed in abutting locations in a physical layout of the IC structure 300 such that the cells 301, 302 form part of a row of standard cells (this row being vertical in the orientation of FIG. 1). The cell 301 comprises circuit elements defined within a cell boundary 304, and the cell 302 likewise comprises circuit elements defined within a cell boundary 306, wherein the cell boundaries 304, 306 abut at boundary edges 308, 310, respectively. The cell 301 includes metal tracks 311, 312, 313, 314, 315 at the M1 layer, and the cell 302 includes corresponding metal tracks 321, 322, 323, 324, 325 at the M1 layer.

For this example, the cell 301 includes metal segments 331, 332, 335 in tracks 311, 312, 315, respectively, and metal tracks 313, 314 are unused by the cell 301. The cell 302 includes metal segments 342, 343, 344, 345 in tracks 322, 323, 324, 325, respectively, and metal track 321 is unused by the cell 302. The cells 301, 302 employ the tip exclusion zones at their opposing row boundaries, as described above. Accordingly, in compliance with this cell design, the metal segment 331 has one tip that terminates within the cell boundary 304 at, or before, the distance 226 (FIG. 2) from the boundary edge 316 (that opposes boundary edge 308) and an opposite tip that extends beyond the cell boundary 304 to the distance 228 (FIG. 2) from the boundary edge 308; the metal segment 332 has one tip that that terminates within the cell boundary 304 at, or before, the distance 226 from the boundary edge 308 and an opposite tip that extends beyond the cell boundary 304 to the distance 228 from the boundary edge 316; and the metal segment 335 has opposing tips that terminate within the cell boundary 304 at, or before, the distance 226 from the boundary edges 308, 316, respectively. Turning to cell 302, the metal segment 342 has one tip that terminates outside of the cell boundary 306 at the distance 228 from the boundary edge 310 and an opposing tip that terminates outside the cell boundary 306 at the distance 228 from a boundary edge 318 (that opposes boundary edge 310); the metal segment 343 has one tip that terminates within the cell boundary 306 at, or before, the distance 226 from the boundary edge 310 and an opposing tip that terminates outside of the cell boundary 306 at the distance 228 from the boundary edge 318; the metal segment 344 has one tip that terminates outside of the cell boundary 306 at the distance 228 from the boundary edge 310 and an opposing tip that terminates outside the cell boundary 306 at the distance 228 from the boundary edge 318, and the metal segment 344 has opposing tips that terminate within the cell boundary 306 at, or before, the distance 226 from the boundary edges 310, 316, respectively.

Given the above-described configuration of the metal segments of the cells 301, 302, when the cells 301, 302 are placed in adjacent locations of a layout of the IC structure 300 as shown by FIG. 3, the metal segment 331 extends from the boundary edge 308 into a portion of the track 321 of the cell 302, and thus complying with the boundary cut design rule that would be applied for a metal cut 350 that would be employed to electrically isolate metal segments of the cells 301, 302 from each other. Likewise, the metal segment 342 extends from cell 302 into the unoccupied region of the metal track 312 of cell 301, thus complying with the boundary cut design rule applied for the metal cut 350. Further, in this example the distances 226 and 228 are equal, and thus the out-of-boundary tip of the metal segment 342 abuts or overlaps the facing in-boundary tip of metal segment 332, thereby forming a single metal segment that spans both tracks 312, 322 until the metal cut 350 is performed. Additionally, the metal segment 343 terminates outside of the metal cut 350, and thus complies with the boundary cut design rule. The metal segment 344 has a tip that extends from cell 302 into the corresponding track 314 of cell 301, and to an extent that spans the breadth of the metal cut 350, and thus ensuring that the metal segment 344 complies with the boundary cut design rule. Metal segments 335, 345 each terminate at least the distance 226 before their respective abutting boundary edges 308, 310. Thus, assuming that the distance 226 is set to be at least one-half of the minimum tip-to-tip distance specified by the design rules, the spacing between the tip of the metal segment 335 and the facing tip of the metal segment 345 complies with this minimum tip-to-tip spacing. Thus, the cell design approach outlined above and employed in the example of FIG. 3 facilitates compliance with the boundary-related design rules described above.

Moreover, this cell design approach has additional benefits pertaining to inter-cell routing and intra-cell routing. To illustrate, because metal segments 335, 345 are not cut at either boundary, other M1 segments (not shown) of the cells 301, 302, respectively may be routed so as to connect to these segments in the unused portions of the metal tracks 315, 325, respectively. Further, while output pin routing may require corresponding M1 segments to reach one boundary for pin hookup, the other side of the metal track may be used for M1 stub routing. To illustrate, tracks 311, 313, 314, 315, 321, 325 have unused regions 351, 353, 354, 355, 361, 365, respectively, available for M1 stub routing (e.g., metal stub 356 in region 353). As such, a benefit of this cell design is that the M1 layer can be used to connect to the cell's M1 pins, as opposed to being forced to use the M2 layer to hook up to the pins. So for example, if one wants to connect segments 335 and 345, one M1 segment can be used to form the connection. In the absence of this design approach, the M1 segment would have been extended and cut on the boundary so the connection would be forced to go up to the M2 layer (horizontal) and then a segment of vertical M3 metal would have connected the two horizontal M2 segments. This adds resistance and capacitance to the pins in addition to blocking precious M2 and M3 routing resources.

Figure 4:
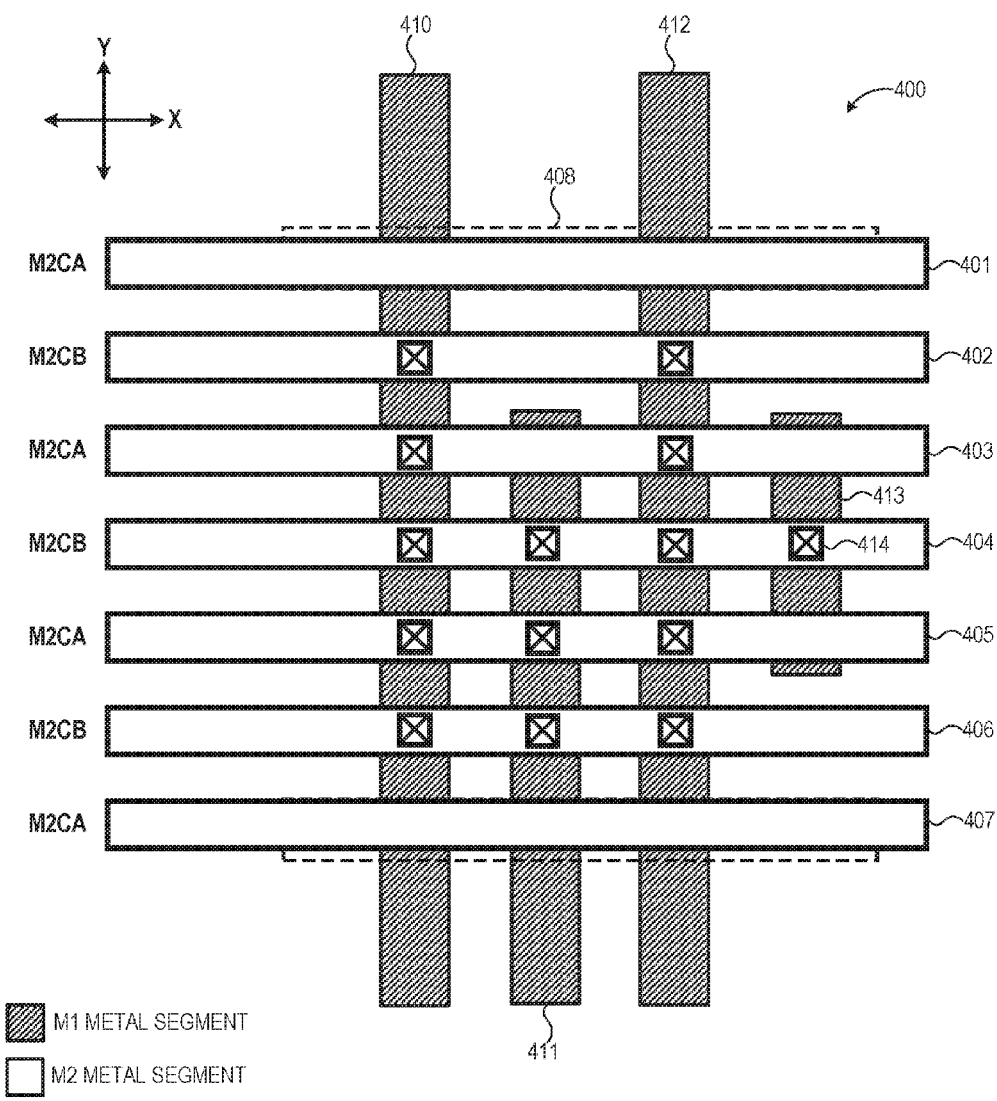
FIG. 4 is a diagram illustrating expanded Metal 1 (M1) layer to Metal 2 (M2) layer connections facilitated by the cell layout of FIG. 2 in accordance with some embodiments.

Additionally, the cell design approach utilizing metal segments that extend beyond the cell boundary also results in metal segments that have greater in-boundary lengths, and thus may intersect a greater number of horizontal (X direction) metal segments at the M2 layer, and thus provide greater pin access to the M2 layer. To illustrate, FIG. 4 depicts an example standard cell 400 for which the M2 layer includes a plurality of M2 metal segments 401, 402, 403, 404, 405, 406, 407 that run horizontally within a cell boundary 408 of the cell 400. Further, cell 400 includes metal segments 410, 411, 412, 413 extending along the vertical direction (Y direction) and thus orthogonally intersecting one or more of the M2 metal segments from the perspective of the illustrated plan view of the cell 400. The metal segments 410-413 adhere to the cell design approach described above, and thus the metal segments 410, 411, 412 extend a set distance beyond the respective edges of the cell boundary 408. In contrast, metal segment 413 terminates at both ends at least the distance 226 before the respective edges of the cell boundary 408, and thus represents a metal segment as typically found in a conventional approach to M1 metal design for a standard cell. As illustrated, due to the relatively short length of the metal segment 413 and minimum dimension requirements between M1 and M2 metal segments for via formation, the metal segment 413 is capable of connecting to only one M2 metal segment (M2 metal segment 404) using a via (e.g., via 414), whereas metal segment 411, by virtue of its extension beyond the bottom edge of the cell boundary 408, can connect to up to three M2 metal segments (M2 metal segments 404, 405, 406) using corresponding vias and metal segments 410, 412, by virtue of their extensions beyond both the top edge and the bottom edge of the cell boundary 408, can connect to up to five M2 metal segments (M2 metal segments 402, 403, 404, 405, 406) using corresponding vias. Thus, by virtue of the overall greater length afforded by permitting metal segments to extend beyond the cell boundary, the cell design approach described herein enables an M1 metal segment to run under a greater number of M2 metal segments, and thus facilitates greater M1-M2 routing resources.

Figure 5:
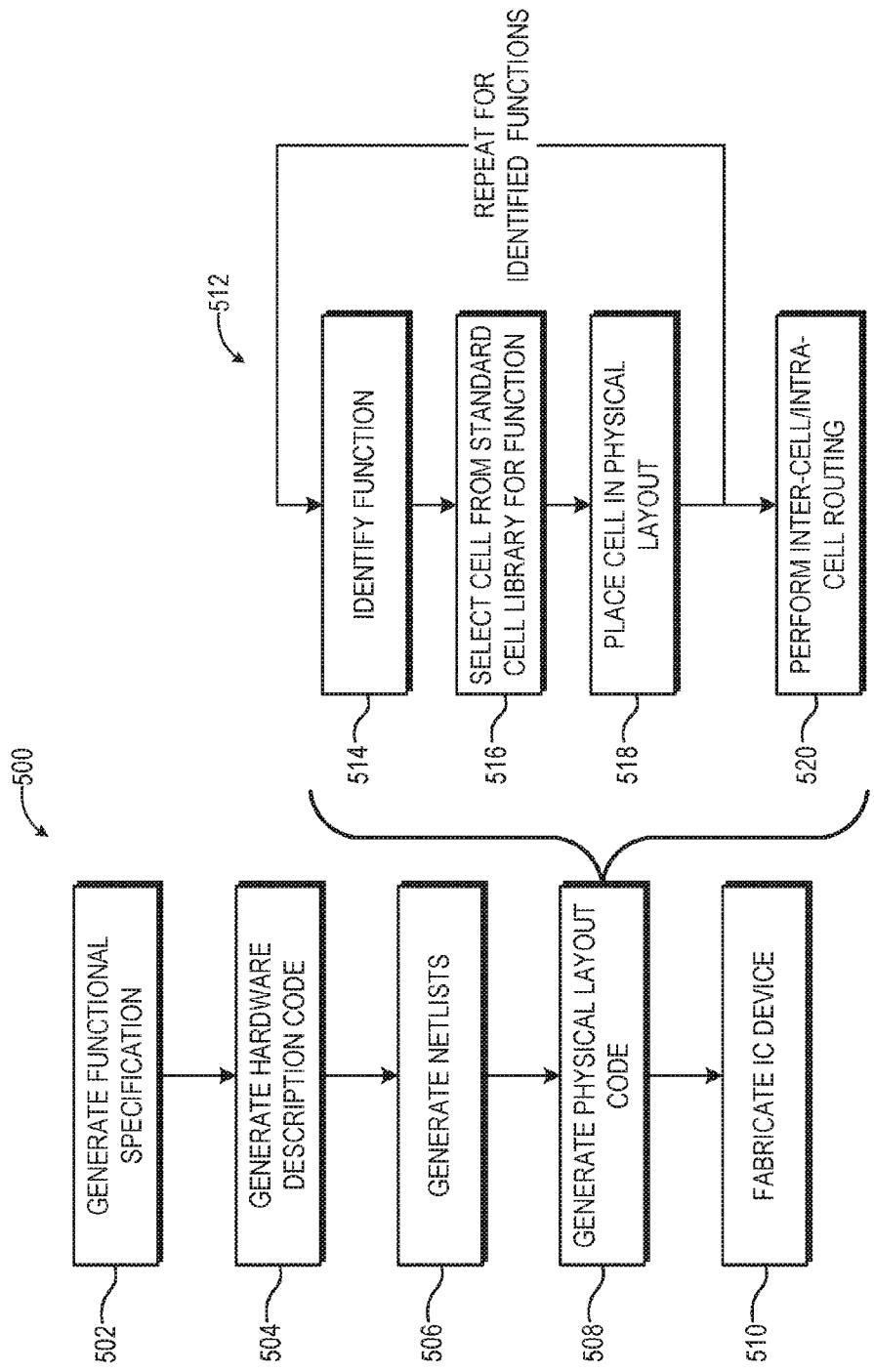
FIG. 5 is a flow diagram illustrating a method for designing and fabricating an integrated circuit structure in accordance with some embodiments.

FIG. 5 is a flow diagram illustrating an example method 500 for the design and fabrication of an ASIC, SoC, or other IC structure implementing one or more aspects in accordance with some embodiments. As noted above, the code generated for each of the following processes is stored or otherwise embodied in non-transitory computer readable storage media for access and use by the corresponding design tool or fabrication tool.

At block 502 a functional specification for the IC structure is generated. The functional specification (often referred to as a micro architecture specification (MAS)) may be represented by any of a variety of programming languages or modeling languages, including C, C++, SystemC, Simulink, or MATLAB.

At block 504, the functional specification is used to generate hardware description code representative of the hardware of the IC structure. In some embodiments, the hardware description code is represented using at least one Hardware Description Language (HDL), which comprises any of a variety of computer languages, specification languages, or modeling languages for the formal description and design of the circuits of the IC structure. The generated HDL code typically represents the operation of the circuits of the IC structure, the design and organization of the circuits, and tests to verify correct operation of the IC structure through simulation. Examples of HDL include Analog HDL (AHDL), Verilog HDL, SystemVerilog HDL, and VHDL. For IC structures implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 506 a synthesis tool is used to synthesize the hardware description code to generate code representing or defining an initial physical implementation of the circuitry of the IC structure. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist is generated manually without the use of a synthesis tool. As with the hardware description code, the netlists may be subjected to one or more test and verification processes before a final set of one or more netlists is generated.

Alternatively, a schematic editor tool is used to draft a schematic of circuitry of the IC structure and a schematic capture tool then is used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 508, one or more EDA tools use the netlists produced at block 506 to generate code representing the physical layout of the circuitry of the IC structure. This process includes, for example, a place and route tool using the netlists to determine or fix the location of each element of the circuitry of the IC structure. Further, a routing tool builds on the placement process to add and route the wires needed to connect the circuit elements in accordance with the netlist(s). The resulting code represents a three-dimensional model of the IC structure. The code is represented in a database file format, such as, for example, the Graphic Database System II (GDSII) format. Data in this format typically represents geometric shapes, text labels, and other information about the circuit layout in hierarchical form.

At block 510, the physical layout code (e.g., GDSII code) is provided to a semiconductor foundry, which uses the physical layout code to configure or otherwise adapt fabrication tools of the semiconductor foundry (e.g., through mask works) to fabricate the IC structure. That is, the physical layout code is programmed into one or more computer systems, which may then control, in whole or part, the operation of the tools of the manufacturing facility or the manufacturing operations performed therein.

Returning to block 508, sub-process 512 illustrates the generation of the physical layout code using a standard cell methodology that employs the tip exclusion zone approach for the M1 layer as described above. For sub-process 512, at block 514 a place and route tool uses the netlist to identify a function (e.g., logic or storage) to be performed by the represented design and at block 516 the place and route tool accesses one or more standard cell libraries to identify a standard cell corresponding to the identified function. The standard cell includes a cell design incorporating the tip exclusion zones. Accordingly, at block 518 the place and route tool identifies a location in a row of the physical layout of the IC design to place the selected standard cell and places the standard cell in this selected location in the physical layout. As part of this placement, metal segments extending beyond the cell boundary of the standard cell may extend into the empty/unused portions of the corresponding metal tracks of the standard cells abutting the cell on either side in the row, as described above. The process of 514-518 then may repeat for each identified function in the netlist or a portion thereof. After placement of standard cells is complete, at block 520 the place and route tool may then perform intra-cell routing within the standard cells and inter-cell routing between the standard cells, wherein the unused portions of the metal tracks having metal segments that extend beyond the cell boundaries is used for M1 stub routing, as described above.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium is embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium is in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An integrated circuit structure comprising:
   a first cell extending along orthogonal first and second directions of a semiconductor substrate and having a cell boundary, the first cell comprising:
      a first metal segment at a first metal track of an M1 metal layer, the first metal segment extending along the first direction and terminating a specified first distance beyond a first edge of the cell boundary; and
      a pin extending outside of the cell boundary of the first cell and coupled to the first metal segment.

2. The integrated circuit structure of claim 1, wherein the first cell further comprises:
   a second metal segment at a second metal track at the M1 metal layer, the second metal segment extending along the first direction and terminating at least a specified second distance before the first edge.

3. The integrated circuit structure of claim 2, wherein the first distance and the second distance are substantially equal.

4. The integrated circuit structure of claim 2, wherein:
   the first metal segment terminates at least the second distance before a second edge of the cell boundary, the second edge opposite the first edge.

5. The integrated circuit structure of claim 4, wherein:
   the second metal segment terminates at least the specified second distance before the second edge of the cell boundary.

6. The integrated circuit structure of claim 5, wherein the first distance and the second distance are substantially equal.

7. The integrated circuit structure of claim 1, further comprising:
   a second cell extending along the first and second directions and having a cell boundary with a second edge adjacent to the first edge of the cell boundary of the first cell; and
   wherein the first metal segment extends into a first metal track of the second cell at the M1 metal layer.

8. The integrated circuit structure of claim 7, wherein the second cell further comprises:
   a second metal segment at a second metal track at the M1 metal layer, the second metal segment extending along the first direction and terminating the specified first distance beyond the second edge; and
   wherein the second metal segment extends into a second metal track of the first cell at the M1 metal layer.

9. The integrated circuit structure of claim 7, wherein:
a remaining portion of the first metal track of the first cell is devoid of metal at the metal layer.

10. The integrated circuit structure of claim 7, wherein:
a remaining portion of the first metal track of the second cell comprises stub routing at the M1 metal layer.

11. A non-transitory computer readable medium embodying a set of executable instructions for fabricating an integrated circuit structure, the set of executable instructions to:
build an integrated circuit structure by extending a cell boundary of a first cell along orthogonal first and second directions and forming a first metal segment at a first metal track at a first metal layer, the first metal segment extending along a first direction and terminating a specified first distance beyond a first edge of the cell boundary; and coupling a pin of the first metal layer outside of the cell boundary of the first cell to the first metal segment.

12. The non-transitory computer readable medium of claim 11, the set of executable instructions further to:
form a second metal segment at a second metal track at the first metal layer, the second metal segment extending along the first direction and terminating a specified second distance before the first edge.

13. The non-transitory computer readable medium of claim 12, wherein:
the first metal segment terminates the second distance before a second edge of the cell boundary, the second edge opposite the first edge.

14. The non-transitory computer readable medium of claim 13, wherein:
the second metal segment terminates the specified second distance before the second edge of the cell boundary.

15. The non-transitory computer readable medium of claim 14, wherein the first distance and the second distance are substantially equal.

16. The non-transitory computer readable medium of claim 11, the set of executable instructions further to:
abut a second edge of a cell boundary of a second cell with the first edge of the cell boundary of the first cell; and
wherein the first metal segment extends into a first metal track of a second cell at the first metal layer.

17. The non-transitory computer readable medium of claim 16, wherein:
the second cell comprises a second metal segment at a second metal track at the first metal layer, the second metal segment extending along the first direction and terminating the specified first distance beyond the second edge; and
the second metal segment extends into a second metal track of the first cell at the first metal layer.

18. The non-transitory computer readable medium of claim 16, the set of executable instructions further to:
route a stub at the first metal layer using a remaining portion of the first metal track.

* * * * *